United States Patent [19]

Newland et al.

[11] 3,988,228

[45] Oct. 26, 1976

[54] PHOTOPOLYMERIZABLE POLYMERIC COMPOSITIONS CONTAINING HALOGEN CONTAINING AROMATIC KETONES

[75] Inventors: Gordon C. Newland; Charles A. Kelly; James G. Pacifici, all of Kingsport, Tenn.

[73] Assignee: Eastman Kodak Company, Rochester, N.Y.

[22] Filed: Aug. 29, 1975

[21] Appl. No.: 609,124

[52] U.S. Cl............. 204/159.23; 204/159.12; 204/159.18; 204/159.19; 96/115 P; 427/54; 526/320; 526/328

[51] Int. Cl.²............ C08F 2/46; C08F 4/00

[58] Field of Search............ 204/159.23, 159.18, 204/159.19, 159.12; 96/115 P

[56] References Cited

UNITED STATES PATENTS 3,686,084  8/1972  Rosenkranz et al............ 204/159.15

*Primary Examiner*—Richard B. Turer
*Attorney, Agent, or Firm*—Clyde L. Tootle; Daniel B. Reece, III

[57] ABSTRACT

The invention relates to photopolymerizable polymeric compositions useful as coating and moldable compositions which are hardenable by ultraviolet radiation. These coating and moldable compositions comprise mixtures of photopolymerizable or photocrosslinkable unsaturated compounds and at least one photoinitiator selected from the group consisting of haloalkyl substituted aromatic ketones.

18 Claims, No Drawings

PHOTOPOLYMERIZABLE POLYMERIC COMPOSITIONS CONTAINING HALOGEN CONTAINING AROMATIC KETONES

This invention relates to photopolymerizable polymeric compositions useful as coating and moldable compositions. More particularly, the invention relates to photopolymerizable compositions comprising photopolymerizable or photocrosslinkable unsaturated compounds and aromatic ketone photoinitiators which compositions harden on exposure to ultraviolet radiation.

Heretofore it has been known to prepare coating compositions consisting of photopolymerizable ethylenically unsaturated materials. It is also known that the degree of polymerization and extent of crosslinking of these systems are dependent upon the intensity of the light. Under direct radiation, this conversion proceeds very slowly, principally because the polymerizable compounds absorb only short wavelength light. Attempts have been made, therefore, to find substances which may be added to the polymerizable or crosslinkable compounds that are capable of accelerating the polymerization.

There are many substances which have been found which are capable of accelerating photpolymerization. Such accelerators include, for example, halogenated aliphatic, alicyclic, and aromatic hydrocarbons and their mixtures in which the halogen atoms are attached directly to the ring structure in the aromatic and alicyclic compounds; that is, the halogen is bonded directly to the aromatic hydrocarbon nucleus; the halogen atoms are attached to the carbon chain in the aliphatic compounds. The halogen may be chlorine, bromine, or iodine. These sensitizers or photoinitiators are used in amounts of about 0.1 to 25% by weight and preferably from 0.5 to 5% of the compound-photoinitiator mixture. Suitable photoinitiators previously used in the art include, for example, polychlorinated polyphenyl resins, such as polychlorinated diphenyls, polychlorinated triphenyl, and mixtures of polychlorinated diphenyls and polychlorinated triphenyls; chlorinated rubbers, such as the Parlons (Hercules Powder Company); copolymers of vinyl chloride and vinyl isobutyl ether, such as Vinoflex MP-400 (BASF Colors and Chemicals, Inc.); chlorinated aliphatic waxes, such as Chlorowax 70 (Diamond Alkali, Inc.); Perchloropentacyclodecane, such as Dechlorane+ (Hooker Chemical Co.); chlorinated paraffins, such as Clorafin 40 (Hooker Chemical Co.) and Unichlor-70B (Neville Chemical Co.); mono- and polychlorobenzenes; mono- and polybromobenzenes; mono- and polychloroxylenes; mono- and polybromoxylenes; dichloromaleic anhydride; 1-chloro-2-methyl naphthalene; 2,4-dimethylbenzene sulfonyl chloride; 1-bromo-3-(m-phenoxy benzene); 2-bromoethyl methyl ether; chlorendic anhydride; and the like; and mixtures thereof, and the like. While there are many photoinitiators known in the art to increase the speed of curability or hardenability of coating and moldable compositions, there is a need in the art for more efficient and effective photoinitiators. Therefore, to provide more effective and efficient photoinitiators would be an advance in the state of the art.

It is, therefore, an object of the present invention to provide more effective and efficient ultraviolet photoinitiators.

Another object of the present invention is to provide useful coating and moldable compositions characterized by improved hardenability to ultraviolet radiation.

It is still another object of the present invention to provide compositions containing photoinitiators which provide ultraviolet curable and hardenable coatings and moldable articles such as films.

It is a still further object of this invention to provide compositions comprising ethylenically unsaturated polymerizable compositions and at least one photoinitiator capable of curing when exposed to actinic radiation and especialy ultraviolet radiation.

It is a still further object of this invention to provide compositions containing photoinitiators capable of curing and hardening when exposed to actinic radiations, including short wave-length visible radiations.

Further objects and advantages of the invention will be apparent to those skilled in the art from the accompanying disclosure and claims.

In accordance with the present invention, polymeric compositions are provided composed of ethylenically unsaturated compounds and a photoinitiator having the following formula:

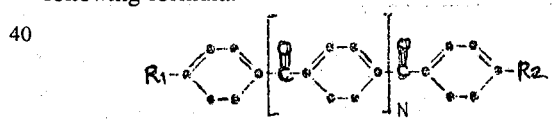

N = 1 to 5

$R_1$ and $R_2$ equal to $CH_2X$, $CHX_2$ $CX_3$ can be the same or different.

X = Cl, Br.

These compounds can be prepared readily by simple acylation under Friedel Crafts conditions followed by halogenation under free radical conditions (Reaction 1 and 2).

1.

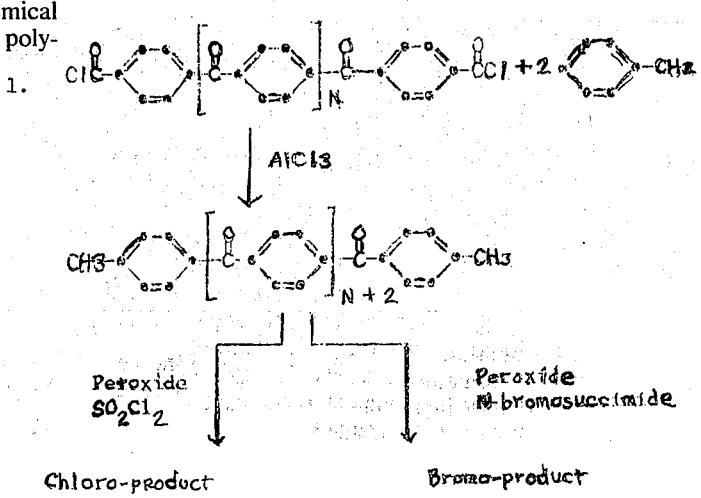

The ethylenically unsaturated compounds useful in the present invention can be for example lower alkyl and substituted alkyl esters of acrylic and methacrylic acid. Examples of such esters include: methyl methacrylate, ethyl methacrylate, 2-ethylhexyl methacrylate, isobutyl methacrylate, butyl acrylate, 2-ethylhexyl acrylate, 2-hydroxyethyl acrylate, 2-methoxyethyl acrylate, 2-hydroxypropyl acrylate, and the like. Also useful are polyacrylyl compounds represented by the general formula:

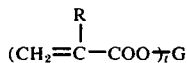

R is hydrogen or methyl; G is a polyvalent alkylene group of the formula

in which X is 2 to 10 and y is 0 to 2 (e.g. (a) divalent alkylene such as $C_xH_{2x}$ when $y = o$, i.e. $-C_2H_4$, $-C_3H_6-$, $-C_5H_{10}-$, neo-$C_5H_{10}$ and the like; (b) trivalent alkylene such as $C_xH_{2x}-1$ when $y = 1$, i.e.

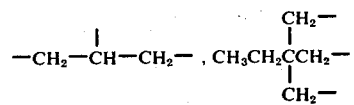

and the like; or (c) tetravalent alkylene such as $C_xH_{2x-2}$ when $y = 2$,

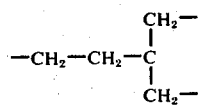

and the like); a divalent $(C_rH_{2r}O)_tC_rH_{2r}-$ group in which $t$ is 1 to 10 (e.g., oxyethylene, oxypropylene, oxybutylene, polyoxyethylene, polyoxypropylene, polyoxybutylene, polyoxyethylene-oxypropylene, $-CH_2C(CH_3)_2COOCH_2C(CH_3)_2CH_2-$ etc.); and $r$ is the valence of G and can be from 2 to 4. Also useful are allyl acrylates and methacrylates; e.g., allyl methacrylate, allyl acrylate, diallyl acrylate. Other unsaturated compounds useful in the invention are, vinyl acetate, vinyl and vinylidine halides; e.g., vinyl chloride, vinylidine chloride, amides; e.g., acrylamide, diacetone acrylamide, vinyl aromatics; e.g., styrene, alkyl styrenes, halostyrenes, and divinyl benzenes.

In addition, other unsaturated compounds which can be photopolymerized by using the initiators of this invention are unsaturated polyester resins which are known in the art. Such polyesters may be prepared by reaction of α,β-unsaturated dicarboxylic acids can be replaced by saturated dicarboxylic acids or aromatic dicarboxylic acids, e.g., isophthalic acid and the like. Polyhydric alcohols are preferably dihydric alcohols such as ethylene glycol, however, trihydric and polyhydric alcohols such as trimethylolpropane can also be conjointly used. Examples of such α,β-unsaturated dicarboxylic acids or their anhydride counterparts include maleic, fumaric, itaconic and citraconic and the like.

The above unsaturated compounds can be used alone or as mixtures of such compounds or mixtures in combination with other unsaturated components and the like.

The photoinitiators may be added at any time in the production of the photopolymerizable compositions in amounts conventionally used for photoinitiators. They are generally used in amounts of from 0.01 to 10%, preferably in amounts of from 0.5 to 3% by weight, based on the weight of the light-sensitive compositions.

Conventional thermal inhibitors which are used in the production of light-sensitive compositions, for example hydroquinone, p-methoxy phenol, t-butyl hydroquinone may also be used in the conventional manner in the light-sensitive compositions of this invention to alter the curing rates and/or to provide longer storage stability.

The photopolymerizable compositions of the present invention may also contan other additives, pigments, colorants, stabilizers and the like. For example, polymeric compositions, such as unsaturated polyesters may also contain and generally do contain other additives such as white or colored pigments or colorants, antioxidants, plasticizers, flow aids, processing aids, polymeric modifiers and the like.

This invention will be further illustrated by the following examples although it will be understood that these examples are included merely for purposes of illustration and are not intended to limit the scope of the invention.

EXAMPLE 1

Di-p-toluylbenzene is prepared according to the following procedure:

A solution of 51 g. (0.25 mole) terephthaloyl chloride in 400 ml of toluene was added dropwise to a slurry of 400 g. of toluene containing 80 g. (0.6 m) AlCl$_3$ over 30 minute period. The mixture was then heated for 2½ hours, cooled to room temperature and poured into a mixture of ice and concentrated HCl. The toluene layer was separated, washed with water and cooled. The product, a white solid, m.p. 190°–192°, was collected by filtration. Yield was 65 g. (82.5%) of di-p-toluylbenzene.

EXAMPLE 2

Bis(α-chlorotoluyl) benzene is prepared according to the following procedure:

Di-p-toluylbenzene (31.4 g., 0.1 mole) was combined with 200 ml of chlorobenzene and heated to 70° C. To this mixture was added 0.1 g. benzoyl peroxide and 34.0 g. (0.25 mole) sulfuryl chloride. After heating between 90°–95° C. for 3 hours the mixture was cooled to 10° C. and the product filtered off. The crude product was washed with water and recrystallized from toluene to give 27 g. (71%) of II, m.p. 189°–190°.

The corresponding brominated di-p-toluylbenzene can also be prepared by using an excess of N-bromosuccimide. The degree of bromination can be determined by procedures known in the art.

EXAMPLE 3

An unsaturated photopolymerizable polymeric composition is prepared as follows:

The compound to be evaluated was admixed with 1:1 2-methoxyethyl acrylate:acetonitrile at a concentration of 0.48 (w/w based on monomer). The mixtures were placed in 3 mm I.D. glass tubes and irradiated with three 8 watt lamps having their principle emission at 350nm. The volume change in relation to irradiation time was measured and the polymerization rate calculated according to the following formula.

$$R_p = \frac{\Delta V}{V(1/Cm - 1/Cp)} \frac{1}{M \Delta t}$$

(V. D. McGinnis and D. M. Dusek J. Paint Tec. 46, No. 589, p. 25 (1974) Where $\Delta V$ is the volume change, V is the original volume, Cm and Cp are the respective densities of monomer and polymer, M is the molecular weight of the monomer and $\Delta t$ is the time required for volume change $\Delta V$ to take place. The polymerization rates for known photoinitiators and a compound of this invention are shown in Table 1.

The data in Table 1 illustrate the superiority of bis($\alpha$-chlorotoluyl) benzene over other photoinitiators known and used in the art. A unique feature of the bis($\alpha$-chlorotoluyl) benzene photoinitiators is the efficiency at long (350 nm) wavelength radiation. This is particularly useful in the application of photocurable coatings since no ozone is produced by this light and the control of this toxic gas is eliminated from the process.

Table 1

| Photopolymerization Rates of Photoinitiators | |
|---|---|
| Photoinitiator at 0.48 % | $R_p \times 10^4$ [a] |
| None | 0 |
| Benzophenone | 0.53 |
| Benzoin isobutyl ether | 2.9 |
| 4,4'-Bis(chloromethyl)benzophenone | 3.18 |
| Bis($\alpha$-chlorotoluyl) benzene | 5.0 |

(a) For 2-methoxyethyl acrylate, $\Delta t$ = 2 minutes.

EXAMPLE 4

The following composition consisting of:
70 parts 2-methoxyethyl acrylate
10 parts cellulose propionate crotonate
10 parts neopentyl glycol diacrylate
5 parts acrylonitrile
42.5 parts $TiO_2$ (Ti-Pure R-100)
was made up by ball-milling the mixture with the pigment. This composition is one suitable for a white base coating for metal stock and the like. Photoinitiators were added to equal portions of the base composition at a concentration of 4%. Films, coated with the compositions, were cured for 0.5 minute with a Gates 420U11B mercury lamp at 5 inches. The cured films were extracted for 2 hours with dichloromethane and the percent extractable material determined. Extractable material in this case represents unpolymerized or uncured monomer. The results of tests on a series of photoinitiators, shown in Table 2, indicate the effectiveness and superiority of the $\alpha$-chlorotoluylbenzene compounds in a pigmented system. These compounds are nonyellowing and hence particularly useful for white formulations.

Table 2

| Photoinitiator at 4% | % Extractable[a] |
|---|---|
| None | 100 |
| Benzoin isobutyl ether | 16.5 |
| 4,4'-Dimethoxybenzil[b] | 38.5 |
| 7:1 Benzophenone:Michlers ketone[b] | 29.7 |
| 4,4'-Bis(chloromethyl)benzophenone | 12.4 |
| Bis($\alpha$-chlorotoluyl)benzene | 9.2 |

(a) By dichloromethane in 2 hours.
(b) Yellows severely during curing.

These photopolymerizable compositions find particular utility as ultraviolet curable films and coatings Such compositions include unsaturated polymeric compositions and a photoinitiator. Such unsaturated polymeric compositions are, for example, unsaturated polyester and polyurethane compositions, which can also contain minor amounts of poly$\alpha$-olefins, polyamides, acrylics, cellulose esters, rubbers both synthetic and natural and the like. Such compositions can be molded or shaped into articles or applied as coatings.

The invention has been described in detail with particular reference to preferred embodiments thereof, but it will be understood that variations and modifications can be effected within the spirit and scope of the invention.

We claim:
1. A composition capable of forming coatings hardenable by ultraviolet radiation comprising a mixture of a photopolymerizable or photocrosslinkable ethylenically unsaturated compound and from 0.01 to 10% by weight of a photoinitiator selected from the group consisting of aryl ketone compounds having the formula

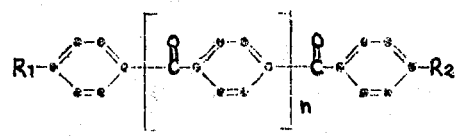

wherein $R_1$ and $R_2$ are —$CH_2X$, —$CHX_2$ and —$CX_3$, where X is chlorine and bromine, and $n$ is an integer of 1 to 5.

2. A composition according to claim 1 wherein said photoinitiator has the formula:

wherein $R_1$ and $R_2$ are —$CH_2X$, —$CHX_2$, —$CX_3$ where X is chlorine or bromine.

3. A composition according to claim 2 wherein said photoinitiator has the formula:

4. A composition according to claim 2 wherein said photoinitiator has the formula:

5. A composition according to claim 2 wherein said photoinitiator has the formula:

6. A composition according to claim 2 wherein said photoinitiator has the formula:

7. A composition according to claim 1 wherein said photoinitiator has the formula:

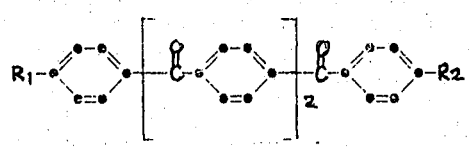

wherein $R_1$ and $R_2$ are $-CH_2X$, $-CHX_2$, $-CX_3$ where X is chlorine or bromine.

8. A composition according to claim 7 wherein said photoinitiator has the formula:

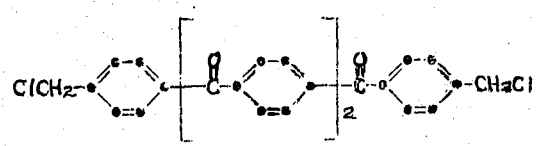

9. A composition according to claim 7 wherein said photoinitiator has the formula:

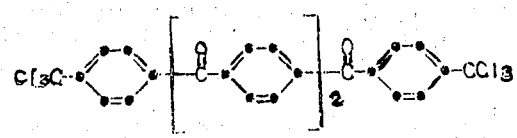

10. A composition according to claim 7 wherein said photoinitiator has the formula:

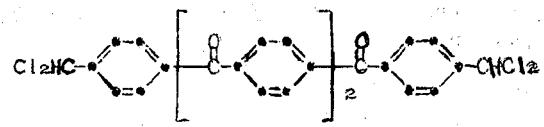

11. A composition according to claim 7 wherein said photoinitiator has the formula:

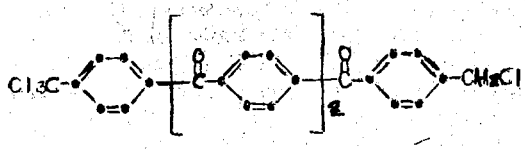

12. A composition according to claim 1 wherein said photoinitiator has the formula:

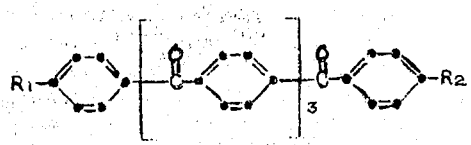

wherein $R_1$ and $R_2$ are $-CH_2X$, $-CHX_2$, and $-CX_3$ where X is chlorine or bromine.

13. A composition according to claim 1 wherein said photoinitiator has the formula:

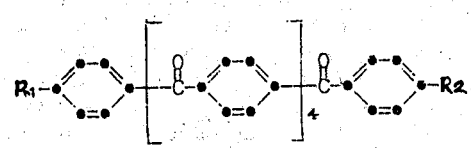

wherein $R_1$ and $R_2$ are $-CH_2X$, $-CHX_2$, and $-CX_3$ where X is chlorine or bromine.

14. A composition according to claim 1 wherein said photoinitiator has the formula:

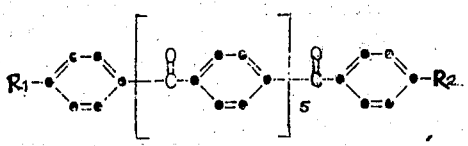

15. A composition according to claim 14 wherein said photoinitiator has the formula:

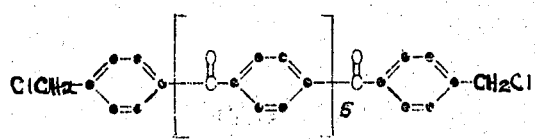

16. A composition according to claim 14 wherein said photoinitiator has the formula:

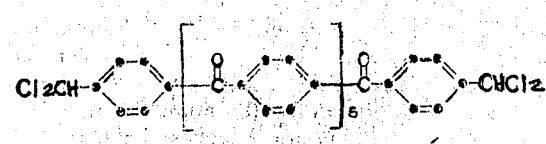

17. A composition according to claim 14 wherein said photoinitiator has the formula:
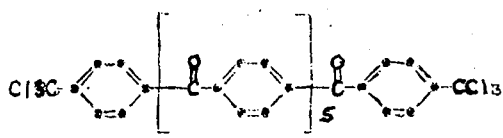
18. A composition according to claim 14 wherein said photoinitiator has the formula
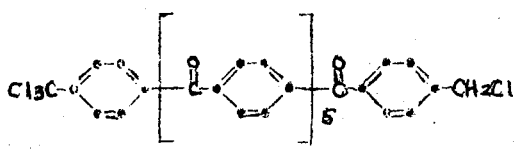
* * * * *